(12) United States Patent
Mahadevan et al.

(10) Patent No.: US 10,264,310 B2
(45) Date of Patent: Apr. 16, 2019

(54) METHOD FOR UNINTERRUPTED PLAYBACK OF CONTENT RECORDING ON SET TOP BOX DURING HEAD END FAILURES

(71) Applicant: ARRIS Enterprises LLC, Suwanee, GA (US)

(72) Inventors: Venkatesh Prabu Mahadevan, Horamaru (IN); S. Subbarayan, Bangalore (IN); Veerabadhran Gopalakrishnan, Tamil Nadu (IN)

(73) Assignee: ARRIS Enterprises LLC, Suwanee, GA (US)

( * ) Notice: Subject to any disclaimer, the term of this patent is extended or adjusted under 35 U.S.C. 154(b) by 0 days.

(21) Appl. No.: 15/374,997

(22) Filed: Dec. 9, 2016

(65) Prior Publication Data
US 2018/0167662 A1 Jun. 14, 2018

(51) Int. Cl.
*H04N 21/433* (2011.01)
*H04N 21/442* (2011.01)
*H04N 21/845* (2011.01)
*H04N 21/4147* (2011.01)

(52) U.S. Cl.
CPC ..... *H04N 21/4334* (2013.01); *H04N 21/4147* (2013.01); *H04N 21/44209* (2013.01); *H04N 21/8455* (2013.01)

(58) Field of Classification Search
CPC .......... H04N 21/4334; H04N 21/2404; H04N 21/4147; H04N 21/44245; H04N 21/4425
See application file for complete search history.

(56) References Cited

U.S. PATENT DOCUMENTS

| 2010/0166384 A1* | 7/2010 | Adimatyam ............. H04N 5/76 386/291 |
| 2011/0219258 A1* | 9/2011 | Cooper ................... G06F 15/16 714/2 |
| 2014/0056122 A1* | 2/2014 | Singal ................ H04L 41/0668 370/220 |

* cited by examiner

*Primary Examiner* — Nasser M Goodarzi
*Assistant Examiner* — Adil Ocak
(74) *Attorney, Agent, or Firm* — Lori Anne D. Swanson

(57) ABSTRACT

Various implementations described herein are directed to technologies for providing uninterrupted playback of a content recording on a set top box during head end failures. The set top box detects a head end failure. An unavailability mode is entered during the detected head end failure. A head end recovery is detected. The unavailability mode is exited. A content unavailability skipper associated with the recorded content is updated. The content unavailability skipper includes instructions for playback of the recorded content.

20 Claims, 11 Drawing Sheets

METHOD FOR UNINTERRUPTED PLAYBACK OF CONTENT RECORDING ON SET TOP BOX DURING HEAD END FAILURES

BACKGROUND

This section is intended to provide background information to facilitate a better understanding of various technologies described herein. As the section's title implies, this is a discussion of related art. That such art is related in no way implies that it is prior art. The related art may or may not be prior art. It should therefore be understood that the statements in this section are to be read in this light, and not as admissions of prior art.

Content recording is one of the basic operations of a digital set top box (STB). A user can schedule a recording anytime on any of the digital channels provided. The STB is responsible for recording the content, e.g., audio/video. The STB receives the actual channel content from a head end.

Any network outage on the head end can lead to content loss. Further, during network outage, the transmission to the STB can be interrupted and blank audio/video may be received. The ongoing recording may also get interrupted. When the user plays back the recorded content, the interruption is seen by the user. This interruption in the recorded content creates an unpleasant user experience.

SUMMARY

Described herein are implementations of various technologies of a method for providing uninterrupted playback of a content recording on a set top box during head end failures. The set top box detects a head end failure. An unavailability mode is entered during the detected head end failure. A head end recovery is detected. The unavailability mode is exited. A content unavailability skipper associated with the recorded content is updated. The content unavailability skipper includes instructions for playback of the recorded content.

The recorded content may be stored in a memory of the set top box. In one implementation, the memory may be a hard disk drive.

The content unavailability skipper may be a data structure. The content unavailability skipper may be metadata of one or more content files.

In one implementation, the recorded content comprises a single file. In this implementation, the set top box continues to record blank data on the single file during the head end failure. The set top box marks a point in the recorded content at which the head end failure occurs. Updating the content unavailability skipper may include marking a point in the recorded content at which the head end recovers.

In one implementation, the set top box stops recording data in a first content file during the head end failure. The set top box resumes recording data in a second content file after the head end recovery. The first content file is re-opened to locate an endpoint for the recorded content. Updating the content unavailability skipper comprises providing a reference value to the second content file.

Also, described herein are implementations of various technologies of a device for providing uninterrupted playback of a content recording on a set top box during head end failures. The device includes a set top box configured to perform various items. The set top box detects a head end failure. An unavailability mode is entered during the detected head end failure. A head end recovery is detected. The unavailability mode is exited. A content unavailability skipper associated with the recorded content is updated. The content unavailability skipper includes instructions for playback of the recorded content.

The set top box may include a memory to store the recorded content. In one implementation, the memory may be a hard disk drive.

Further described herein are implementations of various technologies of a non-transitory computer-readable medium having stored thereon a plurality of computer-executable instructions which, when executed by a computer, cause the computer to: record content received from a head end at a set top box; detect, by the set top box, a head end failure; enter an unavailability mode during the detected head end failure; detect, by the set top box, a head end recovery; exit the unavailability mode; and update a content unavailability skipper associated with the recorded content, the content unavailability skipper including instructions for playback of the recorded content.

In one implementation, the recorded content may be a single file. In another implementation, the set top box stops recording data in a first content file during the head end failure. The set top box may resume recording data in a second content file after the head end recovery.

The above referenced summary section is provided to introduce a selection of concepts in a simplified form that are further described below in the detailed description section. The summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

Implementations of various techniques will hereafter be described with reference to the accompanying drawings. It should be understood, however, that the accompanying drawings illustrate only the various implementations described herein and are not meant to limit the scope of various techniques described herein.

DETAILED DESCRIPTION

One or more implementations of various techniques for providing uninterrupted playback of a content recording on a set top box during head end failures will now be described in more detail with reference to FIGS. 1-12 in the following paragraphs.

The present disclosure provides a method to record content while providing the ability to skip over or stop recording when interruptions, e.g., blank audio and/or video, in content received from the head end are detected. As provided by the methods disclosed herein, when the user plays back the recorded content, the user will not see the interruption, thus providing an improved viewing experience for the user.

The STB has the capability to perform recording of channel contents, e.g., audio and/or video, into Hard Disk Drives (HDD). The user may schedule or manually initiate a recording. The user may initiate playback of previously recorded content from the HDD. The head end is the source of channel content that is broadcast to the STB.

Any failure of the head end equipment will result in a service outage. During the service outage, the head end may fail to serve the channel content. The STB that is already recording the channel content may also be interrupted, since the STB will not receive the content during the outage period.

In prior systems, during the outage period, STB may not record the channel content, record the blank channel content, or terminate the on-going recording. When the head end equipment recovers, the STB may start receiving the channel content again. The STB may continue to record the recovered channel content. However, when the user plays back that recorded content, the interruptions are still noticeable, i.e., the recorded content shows either a blank screen or the playback terminates at the point where the outage occurred.

The present disclosure provides solutions to provide a better user experience when the reception of content is interrupted due to a head end failure.

It is desirable to improve upon methods and systems for processing content that is being recorded while one or more failures occur at the content provider, e.g. a head end.

Figure 1:
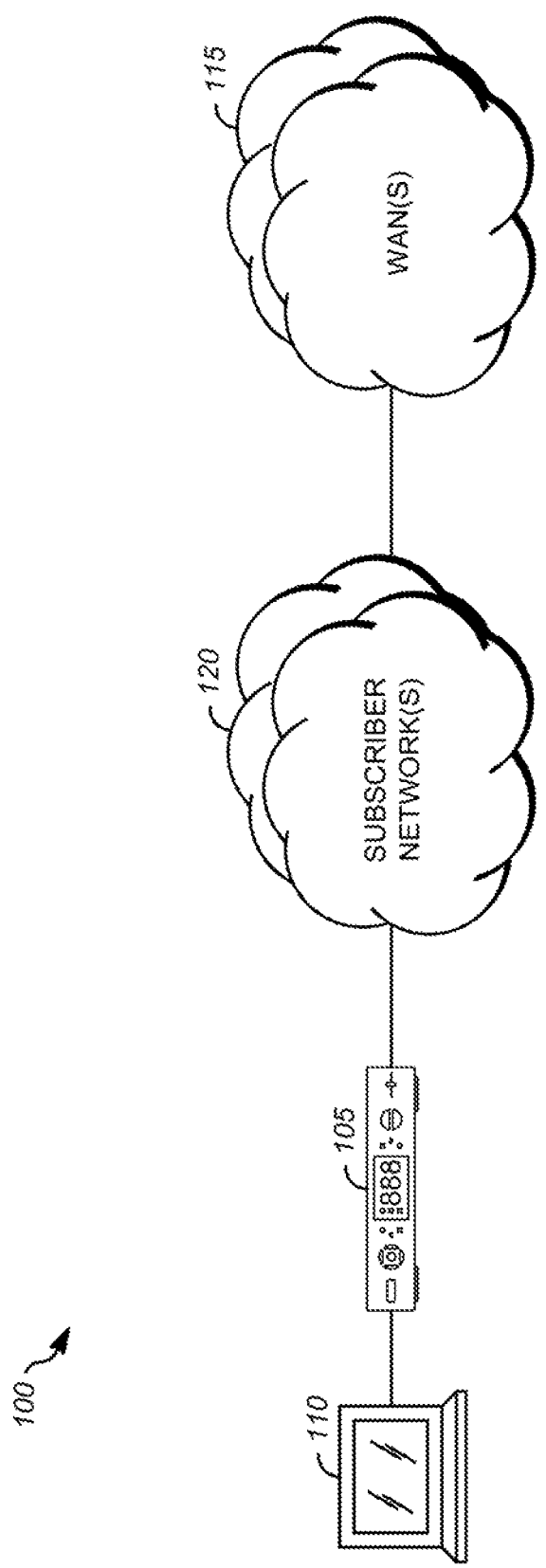
FIG. 1 illustrates an example network environment in accordance with implementations of various techniques described herein.

FIG. 1 is a block diagram illustrating an example network environment 100 that facilitates the processing of recorded content during a head end failure. In some implementations, video, voice, and/or data services may be delivered to one or more client devices via one or more customer premise equipment (CPE) devices installed within a subscriber premise. For example, multiple services may be provided by a set-top box (STB) 105 and may be received by a user through a display device (e.g., television 110). It should be understood that a user may receive multiple services through other display devices such as a mobile device, tablet, computer, gaming console, and others. The various data, multimedia, and/or voice services provided by the STB 105 may include, but is not limited to, live or broadcast television, video-on-demand (VoD) content, pay-per view content, recorded content (e.g., DVR content), audio-only content, streaming content, and others. A set-top box (STB) may receive content from multiple different networks and/or service providers and store this content in a memory.

Multiple services may be delivered to CPE devices over one or more local networks. For example, a local network may be provided by a gateway device, and the multiple services may be delivered to one or more CPE devices by the gateway device. Local network(s) may include a coaxial network, a local area network (LAN), wireless local area network (WLAN), personal area network (PAN), Multimedia over Coax Alliance (MoCA) network, mobile hotspot network, and others. It should be understood that the STB 105 may receive services from and may output upstream communications to an access point (e.g., gateway device, modem, router, wireless extender, etc.) over a wired or wireless connection to the access point.

Multiple services may be delivered to a subscriber premise from a wide-area network (WAN) 115 through a subscriber network 120. The subscriber network 120 may include, for example, a hybrid fiber-coaxial (HFC) network, fiber network, mobile network, satellite network, and any other network operable to deliver services to a subscriber premise.

Multimedia content may be received at the STB 105 as a content stream. For example, the content may be delivered to the STB 105 as a stream of packets or frames, and the packets or frames may be decoded and processed for presentation to a user through a connected display device (e.g., television 110).

The STB 105 may be configured to receive content from a plurality of content or service providers. For example, the STB 105 may receive content from a plurality of different subscriber networks 120 (e.g., a head end of a cable network, satellite network, etc.) and/or WANs 115. Content streams received from different service providers may be received at the STB 105 in different formats.

Figure 2:
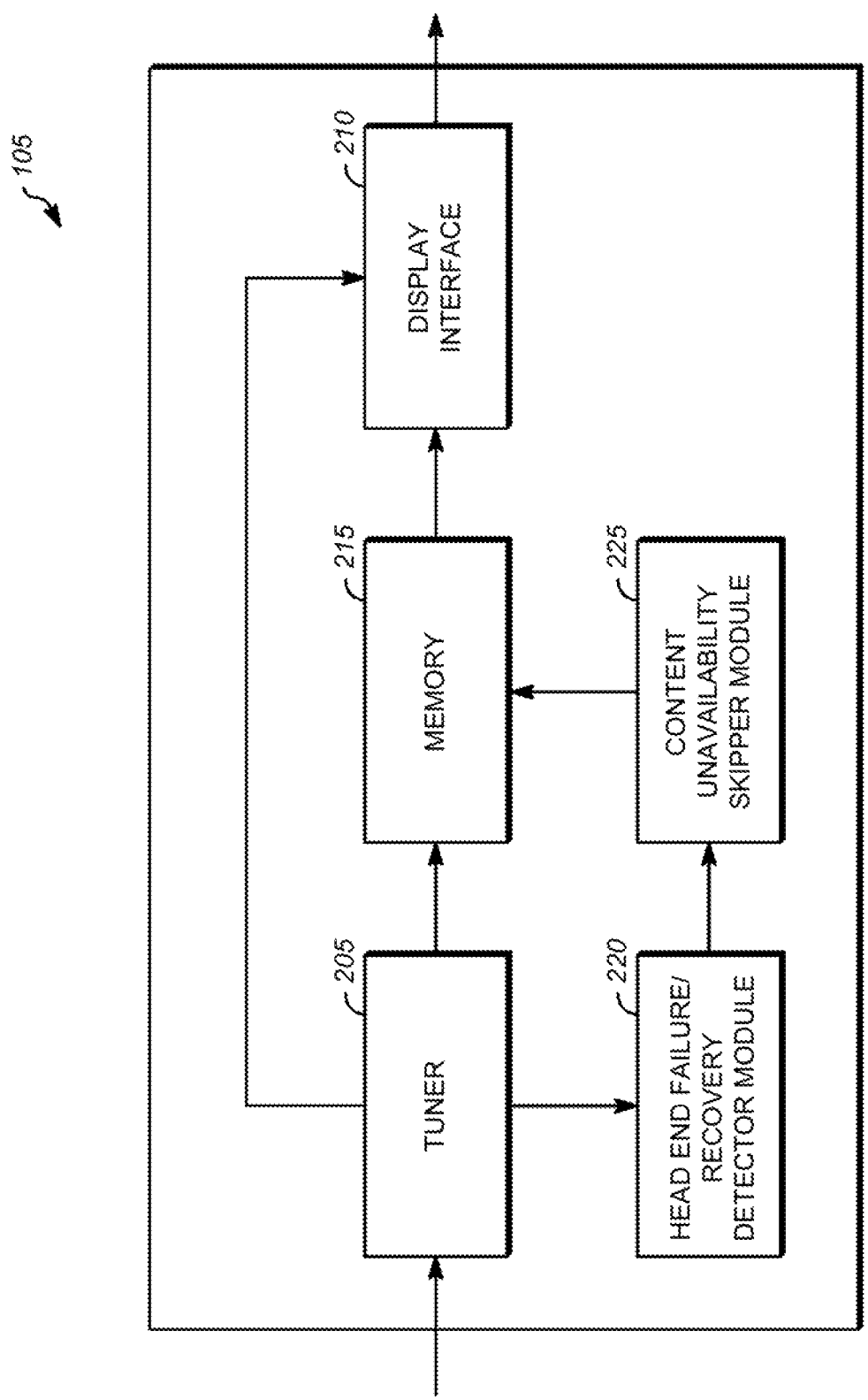
FIG. 2 illustrates an example set top box in accordance with implementations of various techniques described herein.

FIG. 2 is a block diagram illustrating an example set-top box (STB) 105 operable to manipulate content to skip content recorded during head end failures or avoid recording content during head end failures in accordance with various implementations described herein. The STB 105 may include a tuner 205, a display interface 210, a memory 215, a head end failure/recovery detector 220 and a content unavailability skipper module 225.

Multimedia content may be received at the tuner 205. For example, multimedia content may be received at the tuner 205 from an upstream network (e.g., a head end in subscriber network 120 of FIG. 1) as a content stream (e.g., Internet protocol (IP) stream, MPEG stream, etc.). The tuner 205 may decode the received content stream and process the content for output to a display device (e.g., television 110 of FIG. 1) through the display interface 210. The tuner may also process the content for storage in memory 215. It should be understood that content streams may be received at the tuner 205 in a variety of formats and from a variety of content providers and/or networks. For example, the tuner 205 may receive content streams delivered to the STB 105 over a cable network and/or a satellite network.

The head end failure/recovery detector module 220 determines when there is a head end failure and when the head end has recovered. A failure detected by the head end failure/recovery module 220 causes the content unavailability skipper module 225 to modify data associated with the content being stored in memory 215. In one implementation, a head end failure can be detected using an audio/visual log or a frequency log.

In one implementation, content received from a head end through tuner 205 is stored in memory 215 of STB 105. In one implementation, memory 215 may be a hard disk drive. In operation, the head end failure/recovery detector module 220 detects a head end failure. STB 105 enters an unavailability mode using content unavailability skipper module 225. Head end failure/recovery module 220 then detects a head end recovery. Content unavailability skipper module 225 updates a content unavailability skipper associated with the content. The content unavailability skipper includes instructions for playback of the recorded content. In one implementation, the recorded content is stored in one file and includes blank data for the time period associated with the head end failure. In another implementation, the recorded content is stored in separate files and content is not recorded during the head end failure period.

In one implementation, a better user experience is provided for the use case where the STB may continue to record blank data on the same file throughout the outage duration. Although the following figures illustrate one head end failure, the implementations disclosed herein can be applied to a plurality of head end failures resulting in more than one unavailability skipper per content recording.

Figure 3:
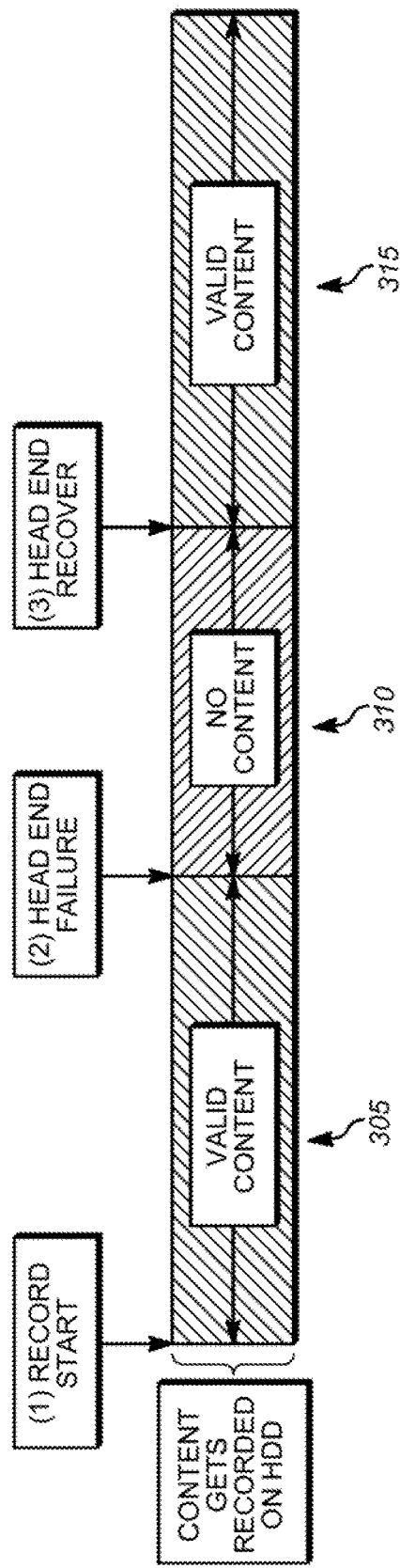
FIG. 3 illustrates content recording in accordance with implementations of various techniques described herein.

FIG. 3 discloses content recording according to one implementation. This scenario is directed to content recording during a head end failure where solutions of the present disclosure are not used. FIG. 3 illustrates content being recorded onto a hard disk drive (HDD) of a STB. During a first time period 305, valid content is being recorded. After a head end failure, recording continues during a second time period 310 but there is no content to record. At time period 315, after the head end recovers, valid content is again recorded.

Figure 4:
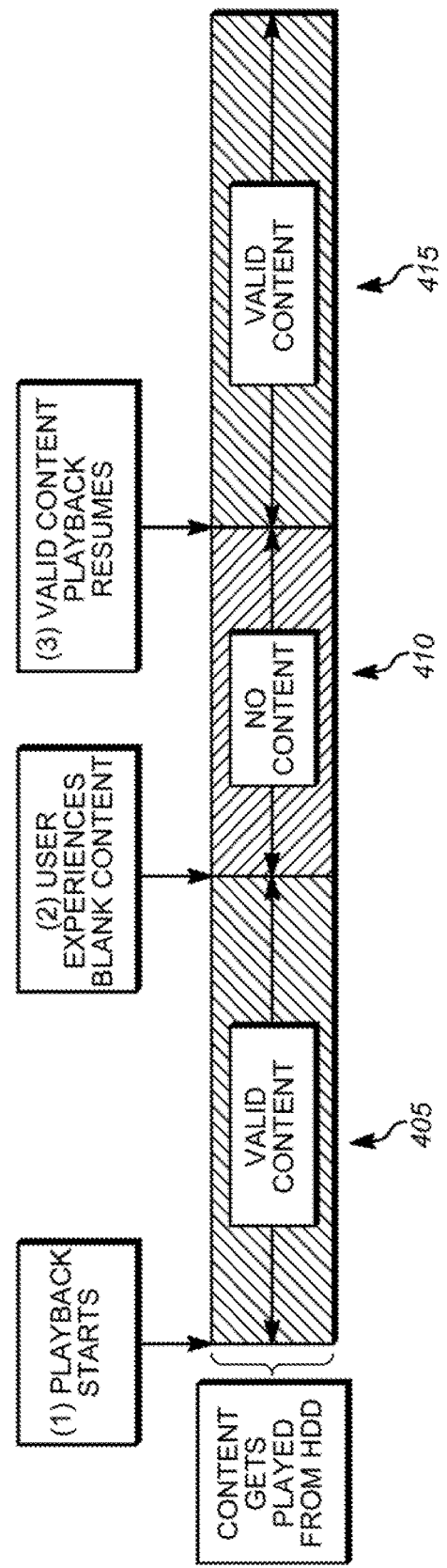
FIG. 4 illustrates content playback in accordance with implementations of various techniques described herein.

FIG. 4 discloses content playback according to one implementation. This scenario is directed to content playback during a head end failure where solutions of the present disclosure are not used. FIG. 4 illustrates the start of playback of recorded content retrieved from a HDD of the STB. During a first time period 405, valid content is played back to the user. Due to the head end failure, no content is shown to the user during a second time period 410. At time period 415 valid content is again shown to the user.

Figure 5:
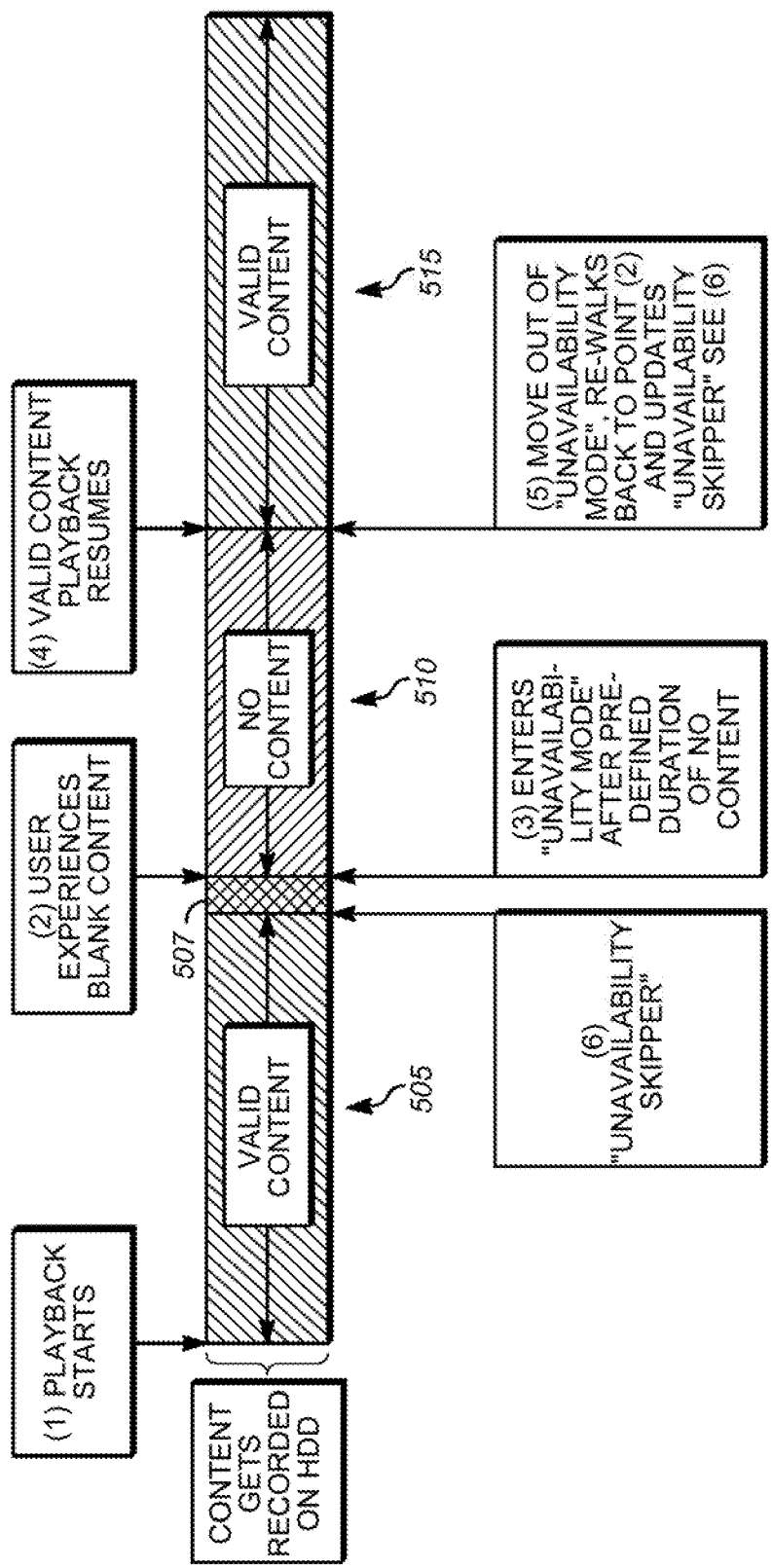
FIG. 5 illustrates content recording in accordance with implementations of various techniques described herein.

FIG. 5 discloses content recording according to an implementation of the present disclosure. This scenario is directed to content recording during a head end failure where a first solution of the present disclosure is used. FIG. 5 illustrates content being recorded onto a HDD of the STB. During a first time period 505, valid content is being recorded. After a head end failure, recording continues during a second time period 510, however, an unavailability mode is entered during this time period. The unavailability mode is entered after a pre-defined time period or threshold during which no content is received from the head end. Whenever there is no content for a specified duration, the recording session goes into unavailability mode and waits for the recovery of the head end. At time period 515, after the head end recovers, valid content is again recorded. Once the head end recovers and content flows, the recording session moves out of unavailability mode and re-walks the content backwards, e.g. marks the point in the recording at which the data is first lost. The head end locates the point where the content originally stopped and updates an unavailability skipper 507.

The unavailability skipper 507 is a data structure that contains an offset or a reference value that refers to the point where the content actually recovered. In one implementation, the unavailability skipper is part of the content file, e.g., metadata. The unavailability skipper 507 can be metadata associated with the stored content.

Figure 6:
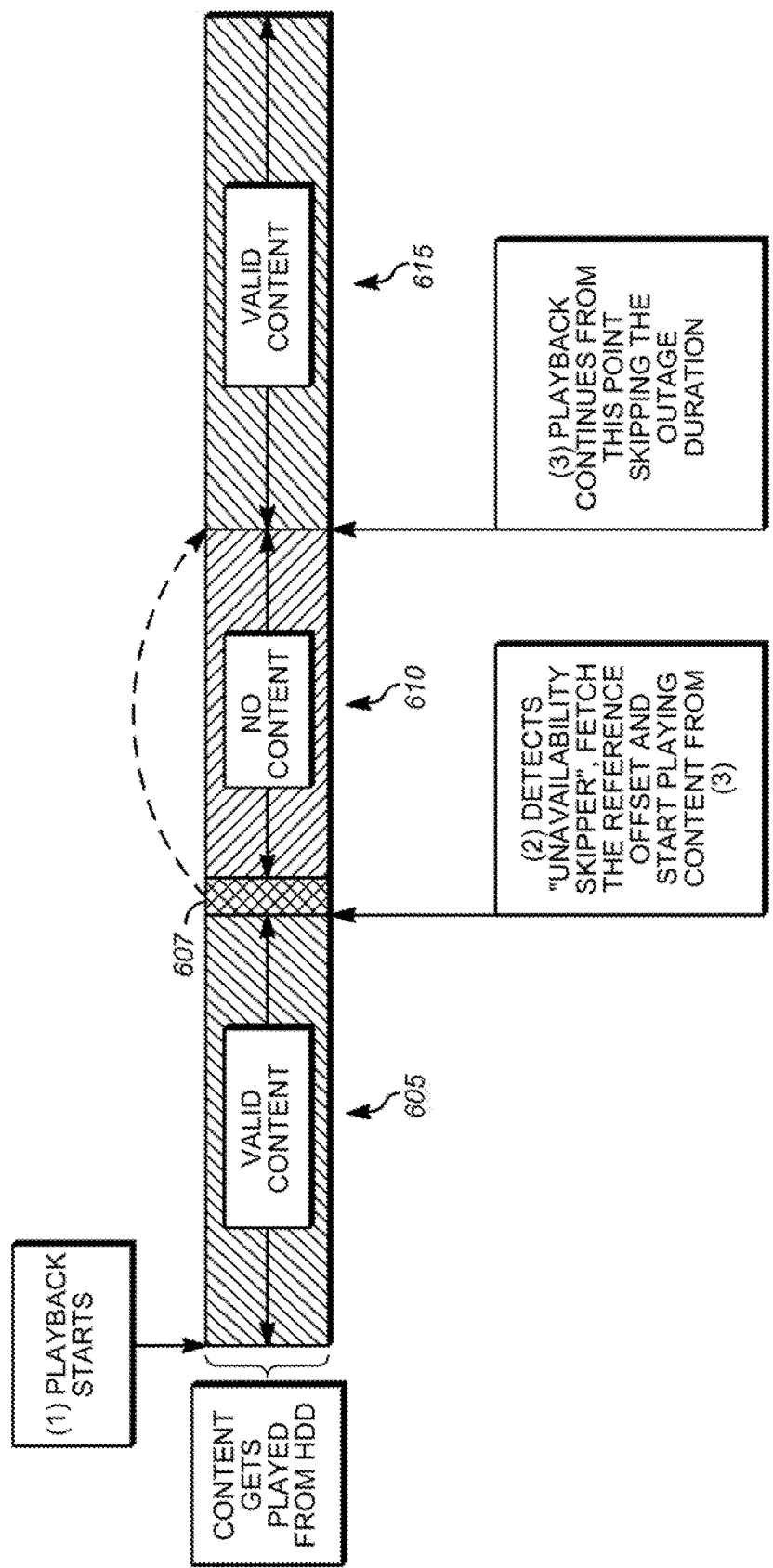
FIG. 6 illustrates content playback in accordance with implementations of various techniques described herein.

FIG. 6 discloses content playback according to an implementation of the present disclosure. This scenario is directed to content playback during a head end failure where a first solution of the present disclosure is used. FIG. 6 illustrates the start of playback of recorded content retrieved from a HDD of the STB. During a first time period 605, valid content is played back to the user. Due to the head end failure, an unavailability skipper 607 has been associated with the stored content. The unavailability trigger fetches reference offset. The unavailability skipper 607 acts as a trigger to immediately move the current playback point to a new point based on the offset or reference value where the next valid content, i.e., the content at item 615, is available. The blank data recorded during the outage that occurred during the second time period 610 is skipped using the unavailability skipper.

In one implementation, a better user experience is provided for the use case where the STB stops recording during a head end failure and records content received subsequent to the head end recovery in a separate file. Although the following figures illustrate one head end failure and two separate files, the implementations disclosed herein can be applied to a plurality of head end failures resulting in more than two separate content files.

Figure 7:
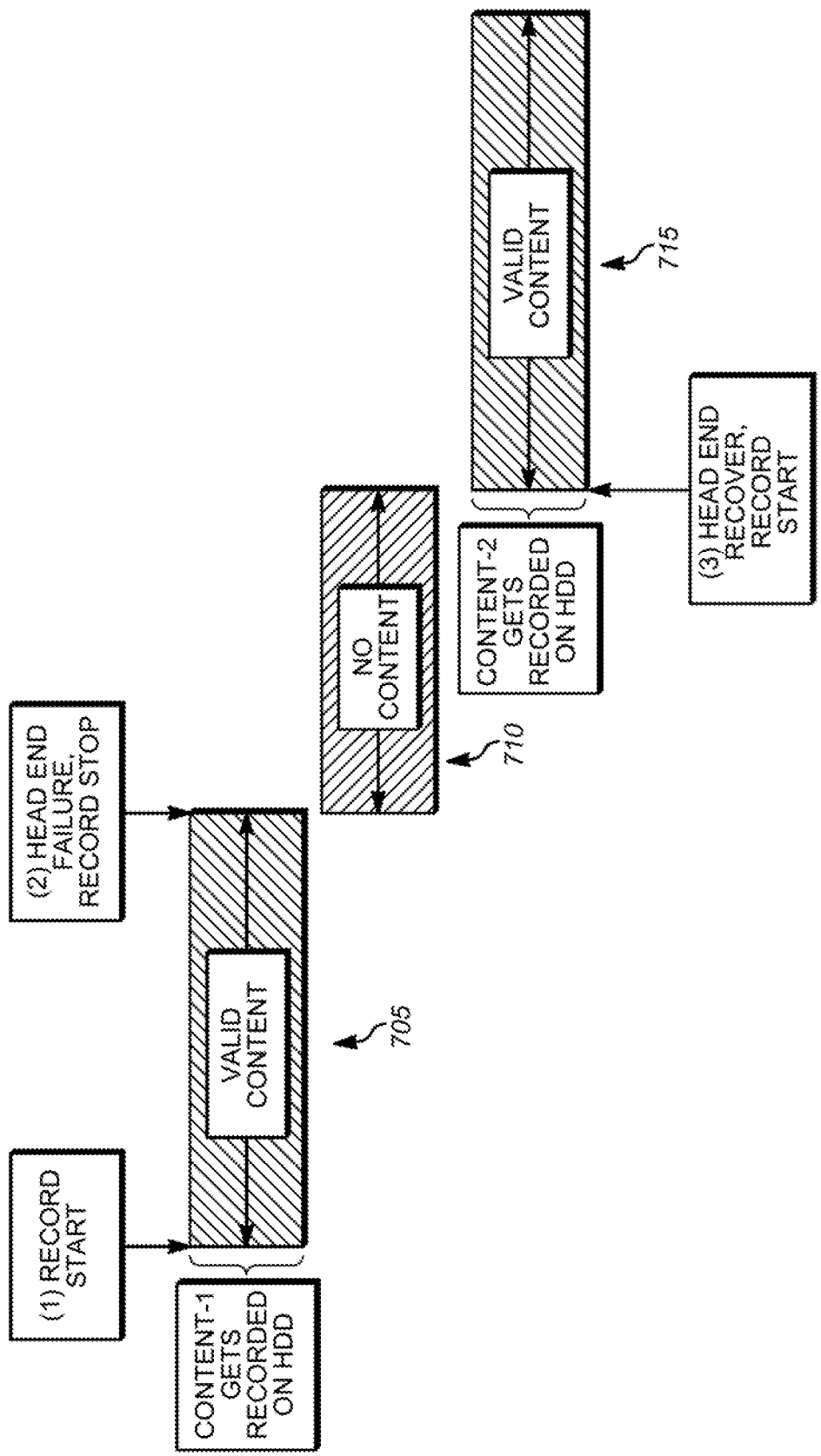
FIG. 7 illustrates content recording in accordance with implementations of various techniques described herein.

FIG. 7 discloses content recording according to one implementation. This scenario is directed to content recording during a head end failure where solutions of the present disclosure are not used. FIG. 7 illustrates content being recorded onto a HDD of the STB. During a first time period 705, valid content is being recorded into a first content file. After a head end failure, recording stops. No recording occurs during a second time period 710. At time period 715, after the head end recovers, valid content is again recorded into a second content file.

Figure 8:
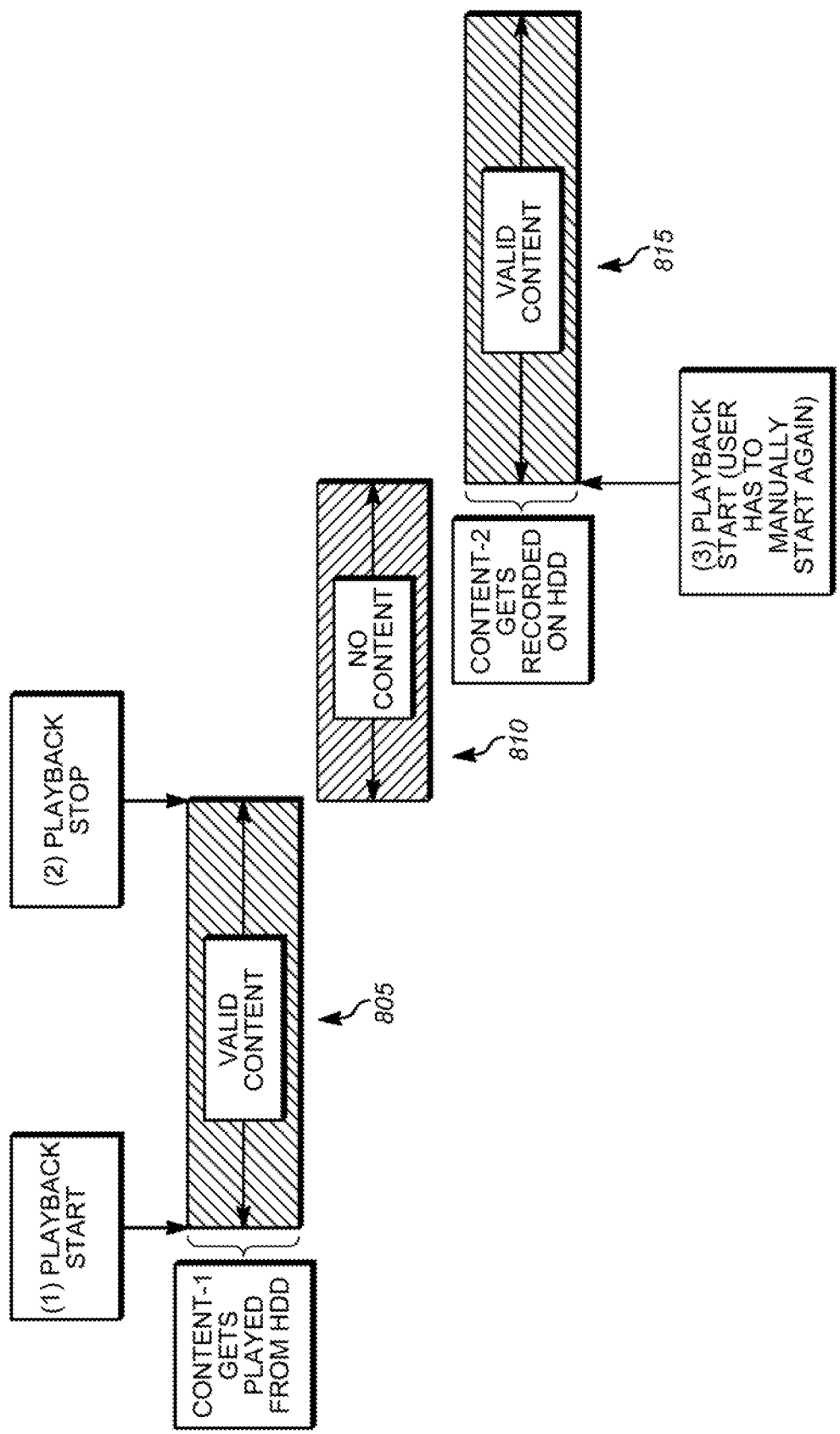
FIG. 8 illustrates content playback in accordance with implementations of various techniques described herein.

FIG. 8 discloses content playback according to one implementation. This scenario is directed to content playback during a head end failure where solutions of the present disclosure are not used. FIG. 8 illustrates the start of playback of a first recorded content file retrieved from the HDD of the STB. During a first time period 805, valid content is played back to the user but stops at the point where the head end failure occurred. No recording occurred during the time period associated with 810. A second content file associated with content recorded after the head end recovery is available, however, the user has to manually start the content associated with time period 815.

Figure 9:
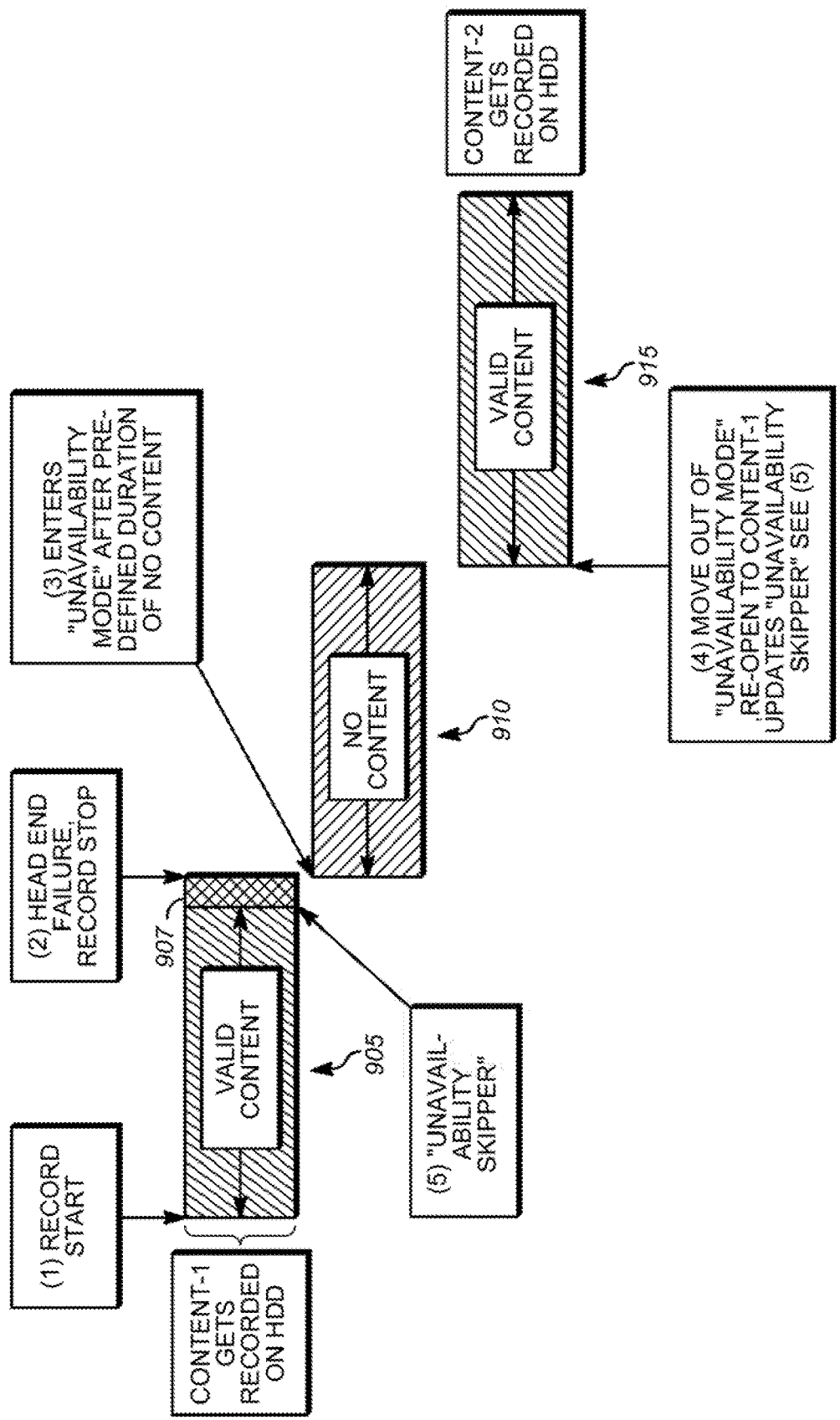
FIG. 9 illustrates content recording in accordance with implementations of various techniques described herein.

FIG. 9 discloses content recording according to an implementation of the present disclosure. This scenario is directed to content recording during a head end failure where a second solution of the present disclosure is used. FIG. 9 illustrates content being recorded onto the HDD of the STB. During a first time period, valid content is being recorded into a first content file 905. After a head end failure, recording stops during the time period represented by item 910. An unavailability mode is entered after a pre-defined time period or threshold during which no content is received from the head end. Whenever there is no content for a specified duration, the recording session enters the unavailability mode and waits for the recovery of the head end. Once the head end recovers and content flows, the recording session moves out of unavailability mode, re-opens the first content file, locates the end point where the content originally stopped and updates an unavailability skipper. The content recorded during a second time period after the recovery of the head end is stored in a second content file 915.

The unavailability skipper is a data structure that includes an offset or a reference value to different content, i.e., the second content file that refers to the point where the content actually recovered. The unavailability skipper 907 is a data structure that contains an offset or a reference value that refers to the point where the content actually recovered. In one implementation, the unavailability skipper is part of the content file, e.g., metadata. The unavailability skipper 907 can be metadata associated with the stored content.

Figure 10:
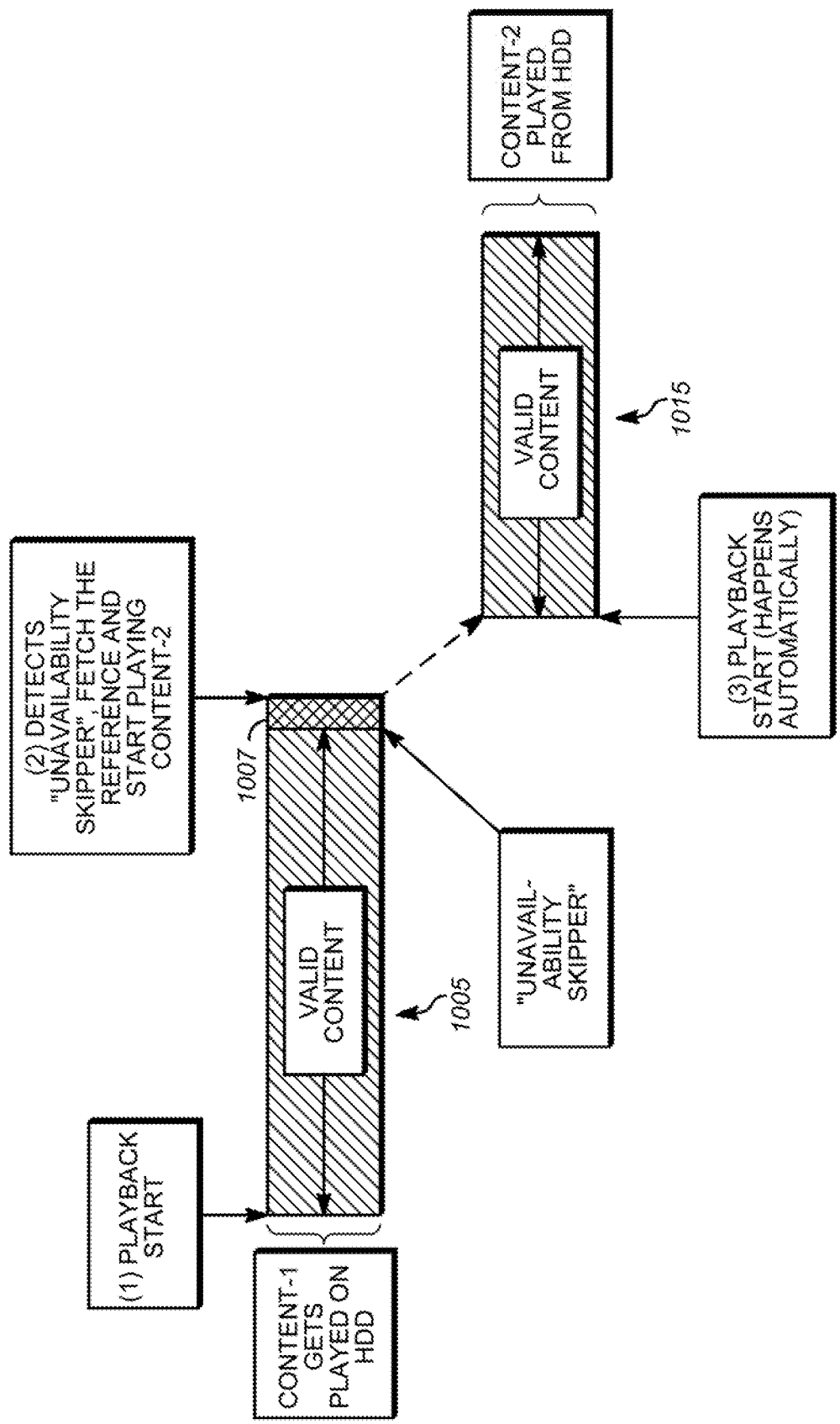
FIG. 10 illustrates content playback in accordance with implementations of various techniques described herein.

FIG. 10 discloses content playback according to an implementation of the present disclosure. This scenario is directed to content playback during a head end failure where the second solution of the present disclosure is used. FIG. 10 illustrates the start of playback of a first recorded content file 1005 retrieved from the HDD of the STB. During a first time period of the first content file 1005, valid content is played back to the user. The unavailability skipper at 1007 acts as a trigger to immediately move the current playback point to a new point at the beginning of the second recorded content file 1015 based on the offset or reference value where the net valid content file is available. Playback of the second content file automatically starts without any user intervention.

Figure 11:
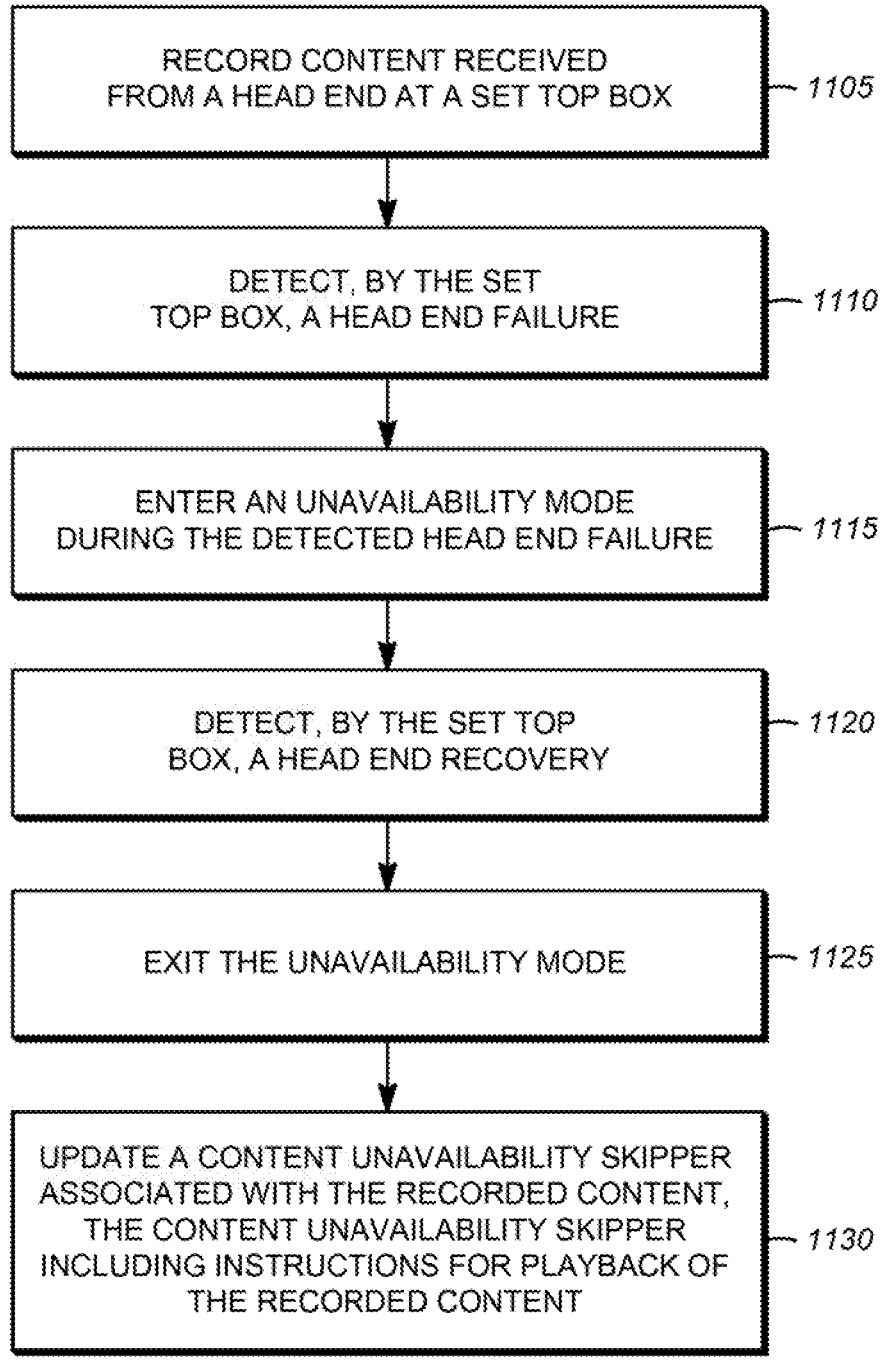
FIG. 11 illustrates a flow diagram of a method for providing uninterrupted playback of a content recording on a set top box during head end failures in accordance with implementations of various techniques described herein

FIG. 11 discloses a diagram of a method for providing uninterrupted playback of a content recording on a set top box during head end failures in accordance with implementations of various techniques described herein. At block 1105, content received from a head end at a set top box is recorded. In one implementation, the received content is stored in a memory 215 of a STB 105. At block 1110, the STB 105 detects a head end failure. At block 1115 an unavailability mode is entered upon detection of the head end failure. At block 1120, the STB 105 detects a head end recovery. At block 1125, the STB 105 exits the unavailability mode. At block 1130, the STB 105 updates a content unavailability skipper associated with the recorded content. The content unavailability skipper includes instructions for playback of the recorded content.

In one implementation utilizing method 1100, the STB may continue to record blank data on the same file throughout the duration of the outage, e.g., the head end failure. This scenario is described above with respect to FIG. 5 and FIG. 6. Content is recorded onto a memory, e.g., HDD, of the STB. During a first time period, valid content is being recorded. After a head end failure, recording continues during a second time period, however, an unavailability mode is entered during this time period. The unavailability mode is entered after a pre-defined time period or threshold during which no content is received from the head end. Whenever there is no content for a specified duration, the recording session goes into unavailability mode and waits for the recovery of the head end. At a third time period, after the head end recovers, valid content is again recorded. Once the head end recovers and content flows, the recording session moves out of unavailability mode and re-walks the content backwards, e.g. marks the point in the recording at which the data is first lost. The set top box locates the point where the content originally stopped and updates an unavailability skipper.

In this implementation, the unavailability skipper is a data structure that contains an offset or a reference value that refers to the point where the content is actually recovered. In one implementation, the unavailability skipper is part of the content file, e.g., metadata. The unavailability skipper can be metadata associated with the stored content.

In another implementation utilizing method 1100, the STB stops recording during a head end failure and records content received subsequent to the head end recovery in a separate file. This scenario is described above with respect to FIG. 9 and FIG. 10. Content is recorded onto a memory, e.g., HDD, of the STB. During a first time period, valid content is being recorded into a first content file 905. After a head end failure, recording stops for this file. An unavailability mode is entered after a pre-defined time period or threshold during which no content is received from the head end. Whenever there is no content for a specified duration, the recording session enters the unavailability mode and waits for the recovery of the head end. Once the head end recovers and content flows, the recording session moves out of unavailability mode, re-opens the first content file, locates the end point where the content originally stopped and updates an unavailability skipper. The content recorded during a second time period after the recovery of the head end is stored in a second content file.

In this implementation, the unavailability skipper is a data structure that includes an offset or a reference value to different content, i.e., the second content file that refers to the point where the content actually recovered. The unavailability skipper is a data structure that contains an offset or a reference value that refers to the point where the content actually recovered. In one implementation, the unavailability skipper is part of the content file, e.g., metadata. The unavailability skipper can be metadata associated with the stored content.

Figure 12:
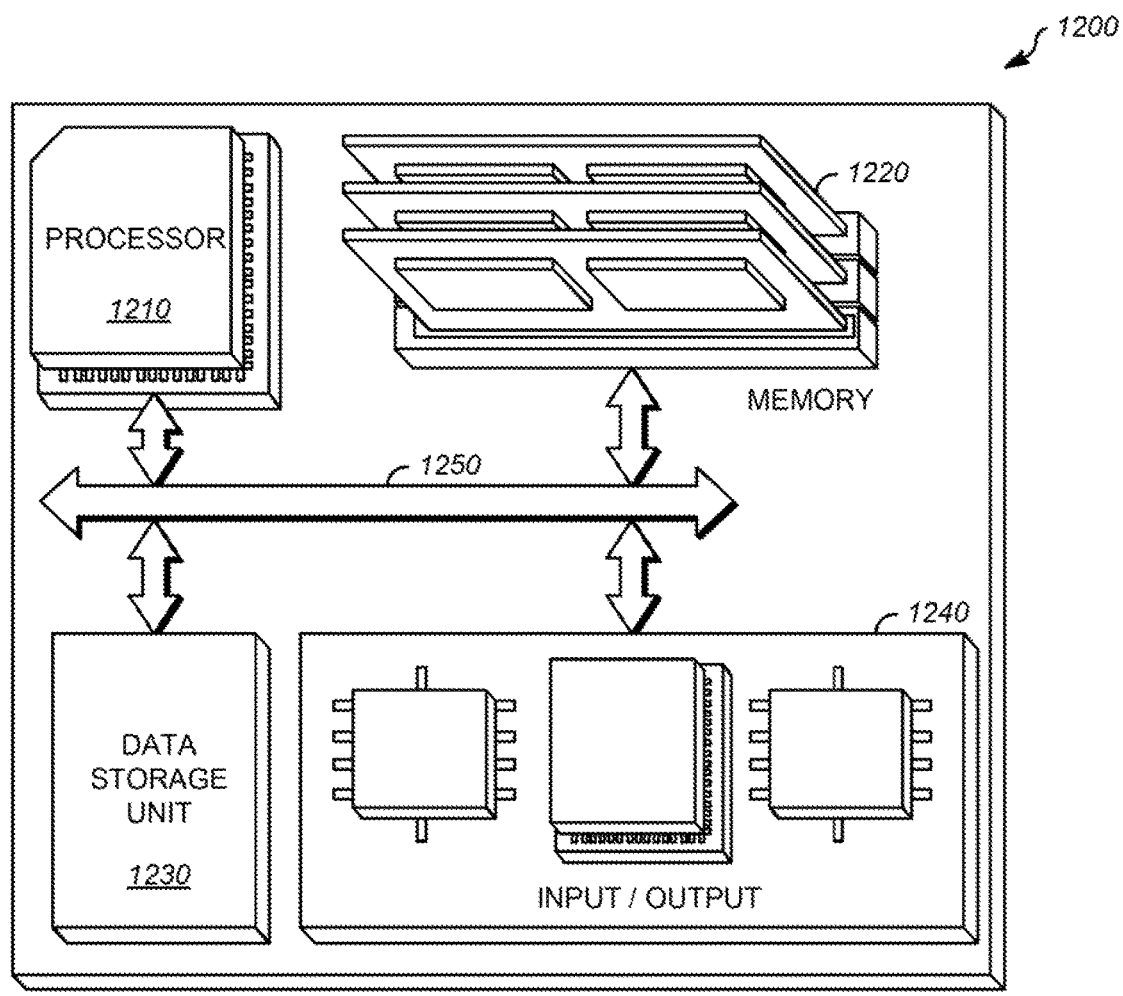
FIG. 12 illustrates a schematic diagram of a computing system in which the various technologies described herein may be incorporated and practiced.

FIG. 12 is a block diagram of a hardware configuration 1200 operable to manipulate content to skip content recorded during head end failures or avoid recording content during head end failures. The hardware configuration 1200 can include a processor 1210, a memory 1220, a storage device 1230, and an input/output device 1240. Each of the components 1210, 1220, 1230, and 1240 can, for example, be interconnected using a system bus 1250. The processor 1210 can be capable of processing instructions for execution within the hardware configuration 1200. In one implementation, the processor 1210 can be a single-threaded processor. In another implementation, the processor 1210 can be a multi-threaded processor. The processor 1210 can be capable of processing instructions stored in the memory 1220 or on the storage device 1230.

The memory 1220 can store information within the hardware configuration 1200. In one implementation, the memory 1220 can be a computer-readable medium. In one implementation, the memory 1220 can be a volatile memory unit. In another implementation, the memory 1220 can be a non-volatile memory unit.

In some implementations, the storage device 1230 can be capable of providing mass storage for the hardware configuration 1200. In one implementation, the storage device 1230 can be a computer-readable medium. In various different implementations, the storage device 1230 can, for example, include a hard disk device/drive, an optical disk device, flash memory or some other large capacity storage device. In other implementations, the storage device 1230 can be a device external to the hardware configuration 1200.

The input/output device 1240 provides input/output operations for the hardware configuration 1200. In one implementation, the input/output device 1240 can include one or more of a network interface device (e.g., an Ethernet card), a serial communication device (e.g., an RS-232 port), one or more universal serial bus (USB) interfaces (e.g., a USB 2.0 port), one or more wireless interface devices (e.g., an 802.11 card), and/or one or more interfaces for outputting video, voice, and/or data services to a display device (e.g., television 110 of FIG. 1, mobile device, tablet, computer, etc.). In embodiments, the input/output device can include driver devices configured to send communications to, and receive communications from one or more networks (e.g., local network, subscriber network 120 of FIG. 1, WAN 115 of FIG. 1, etc.).

The subject matter of this disclosure, and components thereof, can be realized by instructions that upon execution cause one or more processing devices to carry out the processes and functions described above. Such instructions can, for example, comprise interpreted instructions, such as script instructions, e.g., JavaScript or ECMAScript instructions, or executable code, or other instructions stored in a computer readable medium.

Implementations of the subject matter and the functional operations described in this specification can be provided in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification are performed by one or more programmable processors executing one or more computer programs to perform functions by operating on input data and generating output thereby tying the process to a particular machine (e.g., a machine programmed to perform the processes described herein). The processes and logic flows can also be performed by, and apparatus can also be implemented as, special purpose logic circuitry, e.g., an FPGA (field programmable gate array) or an ASIC (application specific integrated circuit).

Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD ROM disks. The processor and the memory can be supplemented by, or incorporated in, special purpose logic circuitry.

The implementations of the present disclosure provide certain advantages. The present disclosure improves the content recording feature during scenarios of head end failures. Head end failures are common and highly affect end-to-end network performance. The present disclosure improves the user experience for content playback with respect to contents that were interrupted during head end failures. In addition, implementation of the present disclosure does not require any user intervention at the set top box.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results, unless expressly noted otherwise. As one example, the processes depicted in the accompanying figures do not necessarily require the particular order shown, or sequential order, to achieve desirable results. In some implementations, multitasking and parallel processing may be advantageous.

The discussion above is directed to certain specific implementations. It is to be understood that the discussion above is only for the purpose of enabling a person with ordinary skill in the art to make and use any subject matter defined now or later by the patent "claims" found in any issued patent herein.

It is specifically intended that the claimed invention not be limited to the implementations and illustrations contained herein, but include modified forms of those implementations including portions of the implementations and combinations of elements of different implementations as come within the scope of the following claims. It should be appreciated that in the development of any such actual implementation, as in any engineering or design project, numerous implementation-specific decisions may be made to achieve the developers' specific goals, such as compliance with system-related and business related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure. Nothing in this application is considered critical or essential to the claimed invention unless explicitly indicated as being "critical" or "essential."

In the above detailed description, numerous specific details were set forth in order to provide a thorough understanding of the present disclosure. However, it will be apparent to one of ordinary skill in the art that the present disclosure may be practiced without these specific details. In other instances, well-known methods, procedures, components, circuits and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first object or step could be termed a second object or step, and, similarly, a second object or step could be termed a first object or step, without departing from the scope of the invention. The first object or step, and the second object or step, are both objects or steps, respectively, but they are not to be considered the same object or step.

The terminology used in the description of the present disclosure herein is for the purpose of describing particular implementations only and is not intended to be limiting of the present disclosure. As used in the description of the present disclosure and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises" and/or "comprising," when used in this specification, specify the presence of stated features, integers, steps, operations, elements, and/or components, but do not preclude the presence or addition of one or more other features, integers, steps, operations, elements, components and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context. As used herein, the terms "up" and "down"; "upper" and "lower"; "upwardly" and "downwardly"; "below" and "above"; and other similar terms indicating relative positions above or below a given point or element may be used in connection with some implementations of various technologies described herein.

While the foregoing is directed to implementations of various techniques described herein, other and further implementations may be devised without departing from the basic scope thereof, which may be determined by the claims that follow. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method, comprising:
   recording content received from a head end at a set top box in to one or more files;
   detecting, by the set top box, a head end failure that interrupts a receipt of the content from the headend and causes an interruption to recording of said content at the set top box;
   entering an unavailability mode during the detected head end failure;
   detecting, by the set top box, a head end recovery;
   exiting the unavailability mode and begin receiving and recording content again from the recovered head end to the one or more files; and
   updating a content unavailability skipper associated with the recorded content, the content unavailability skipper including instructions for playback of the recorded content that moves playback from a point of the interrupted recording to a point of head end recovery; and
   providing playback of said recorded content in accordance with the content unavailability skipper that offsets a period of interruption in the recorded content by moving a playback point to a point of head end recovery.

2. The method of claim 1, wherein the recorded content is stored in a memory of the set top box.

3. The method of claim 2, wherein the memory comprises a hard disk drive.

4. The method of claim 1, wherein the content unavailability skipper comprises a data structure.

5. The method of claim 1, wherein the content unavailability skipper comprises metadata.

6. The method of claim 1, wherein the recorded content comprises a single file.

7. The method of claim 6, wherein the set top box continues to record blank data on the single file during the head end failure.

8. The method of claim 7, wherein the set top box marks a point in the recorded content at which the head end failure occurs.

9. The method of claim 8, wherein updating the content unavailability skipper comprises marking a point in the recorded content at which the head end recovers.

10. The method of claim 1, wherein the set top box stops recording data in a first content file during the head end failure.

11. The method of claim 10, wherein the set top box resumes recording data in a second content file after the head end recovery.

12. The method of claim 11, wherein the first content file is re-opened to locate an endpoint for the recorded content.

13. The method of claim 12, wherein updating the content unavailability skipper comprises providing a reference value to the second content file.

14. A device, comprising:
   a set top box configured to:
      record content received from head end at a set top box in to one or more files;
      detect a head end failure that interrupts a receipt of the content from the headend and an interruption to recording of said content at the set top box;
      entering an unavailability mode during the detected head end failure;
      detect a head end recovery;
      exit the unavailability mode and begin receiving and recording the content again from the recovered head end to the one or more files; and
      update a content unavailability skipper associated with the recorded content, the content unavailability skipper including instructions for playback of the recorded content that moves playback from a point of the interrupted recording to a point of head end recovery; and provide playback of said recorded content in accordance with the content unavailability skipper that offsets a period of interruption in the recorded content by moving a playback point to a point of head end recovery.

15. The device of claim 14, wherein the set top box further comprises a memory to store the recorded content.

16. The device of claim 15, wherein the memory comprises a hard disk drive.

17. A non-transitory computer-readable medium having stored thereon a plurality of computer-executable instructions which, when executed by a computer, cause the computer to:

record content received from a head end at a set top box in to one or more files;

detect a head end failure that interrupts a receipt of the content from the headend and an interruption to recording of said content at the set top box;

enter g an unavailability mode during the detected head end failure;

detect a head end recovery;

exit the unavailability mode and begin receiving and recording the content again from the recovered head end to the one or more files; and update a content unavailability skipper associated with the recorded content, the content unavailability skipper including instructions for playback of the recorded content that moves playback from a point of the interrupted recording to a point of head end recovery; and provide playback of said recorded content in accordance with the content unavailability skipper that offsets a period of interruption in the recorded content by moving a playback point to a point of head end recovery.

18. The non-transitory computer-readable medium of claim 17, wherein the recorded content comprises a single file.

19. The non-transitory computer-readable medium of claim 17, wherein the set top box stops recording data in a first content file during the head end failure.

20. The non-transitory computer-readable medium of claim 19, wherein the set top box resumes recording data in a second content file after the head end recovery.

* * * * *